Jan. 30, 1945.  H. SPEDDING  2,368,579
CHECKING MACHINE
Filed Nov. 13, 1943  2 Sheets-Sheet 1

INVENTOR.
Howard Spedding
BY
ATTORNEYS.

Jan. 30, 1945.  H. SPEDDING  2,368,579
CHECKING MACHINE
Filed Nov. 13, 1943   2 Sheets-Sheet 2
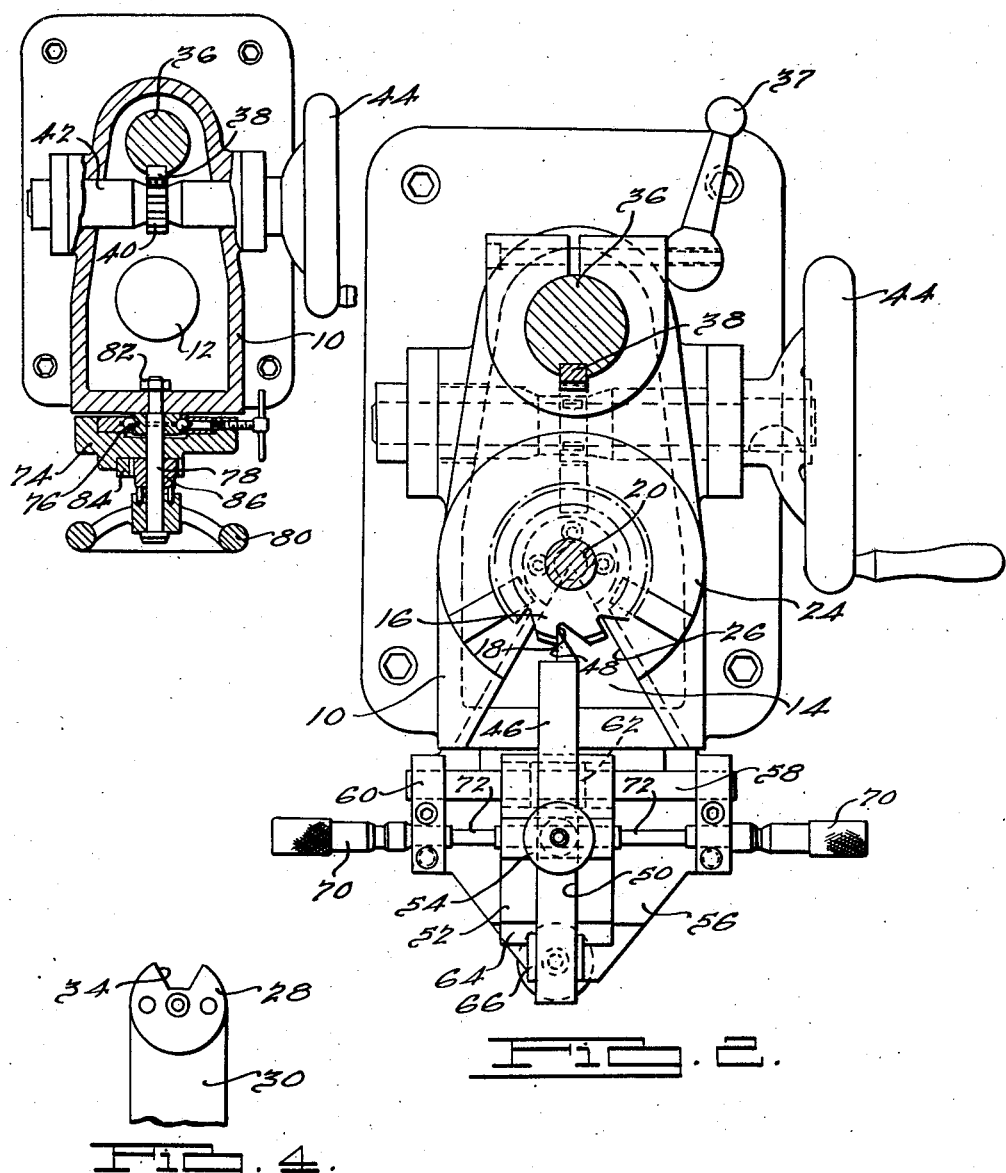
INVENTOR.
Howard Spedding.
BY
Harness, Dickey & Pierce
ATTORNEYS.

Patented Jan. 30, 1945

2,368,579

UNITED STATES PATENT OFFICE 2,368,579

CHECKING MACHINE

Howard Spedding, Detroit, Mich., assignor to Detroit Tap & Tool Company, Detroit, Mich., a corporation of Delaware Application November 13, 1943, Serial No. 510,250

4 Claims. (Cl. 33—201)

The present invention relates to a checker and particularly relates to a device for checking the flute faces of circular metal cutting tools.

The primary object of the present invention is to provide a simplified checker of the type mentioned by which a quick, accurate, and visual check of the flute faces of cutters may be made, and by which, particularly, the hook angle may be readily checked.

Other objects of the present invention will become apparent from the following specification, the drawings relating thereto, and from the claims hereinafter set forth.

In the drawings in which like numerals refer to like parts in the several views throughout:

Figure 2 is a plan view taken along the line 2—2 of Figure 1.

Figure 3 is a reduced cross-sectional view taken along the line 3—3 of Figure 1.

Figure 4 is a partial plan view taken along the line 4—4 of Figure 1.

Figure 1:
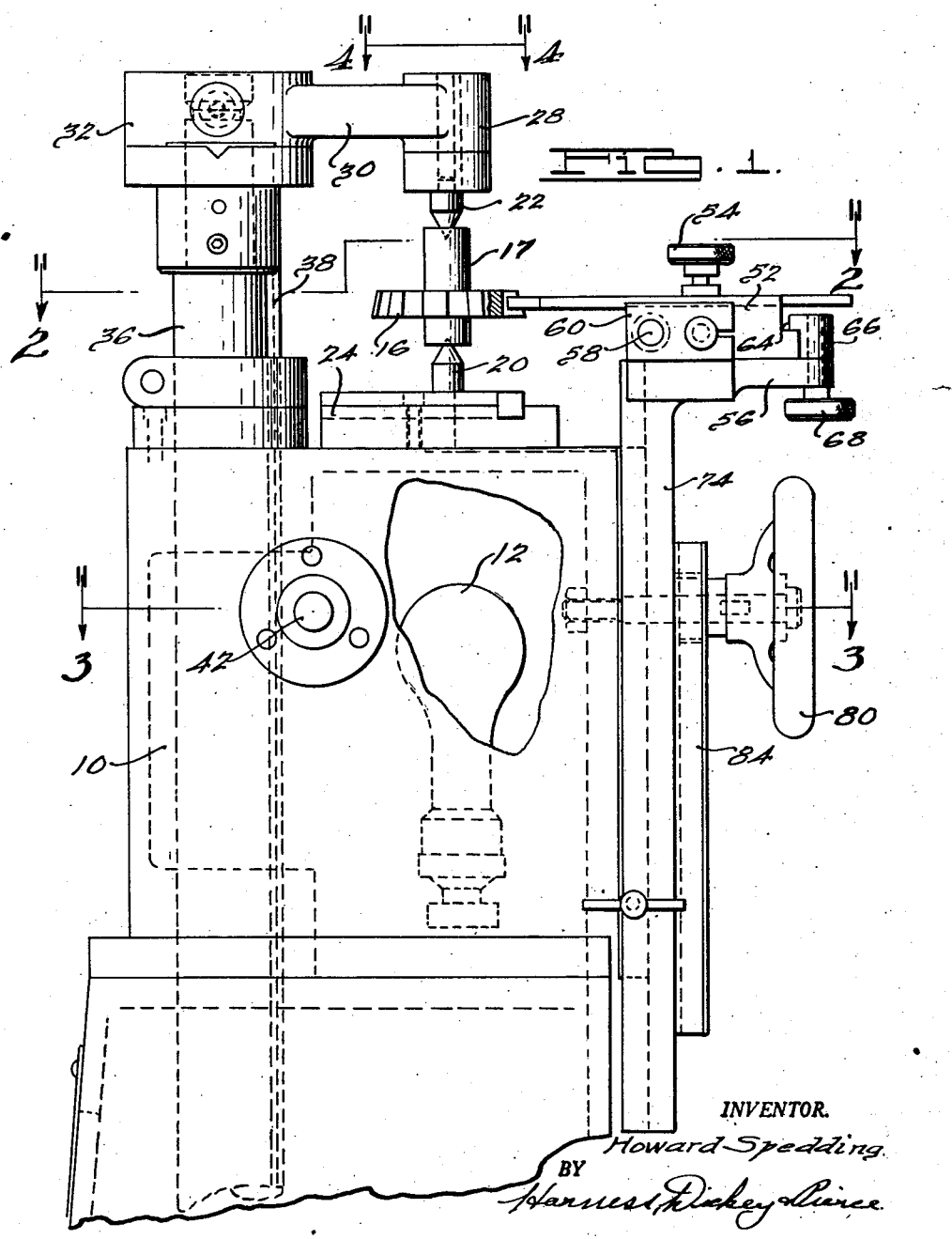
Figure 1 is a partial, side elevational view, with parts broken away, of a checker embodying the features of the present invention.

The checker of the present invention is particularly intended for use in checking the hook angle of circular cutters by the amount that the flute face is offset from center, which is a measure of the hook angle.

In general, in the fixture of the present invention, the cutter is mounted on a vertical axis with illuminating means disposed under the cutter. A knife edge indicator may be moved into engagement with the face of the flute and such indicator is mounted so that it may be moved on a line perpendicular to a radius of the cutter a distance which is a measure of the hook angle. It is held at that point to which it has been moved along the line perpendicular to the radius and may then be moved in and out with respect to the cutter, through that point, on another line parallel to the perpendicular radius. The perpendicular radius is that radius of the cutter through the center substantially in the plane of the cutter which is perpendicular to the first-mentioned line along which the indicator is moved. The distance between the radius and the line parallel to the radius through the point mentioned above is the measure of the hook angle. It can be readily determined by looking down at the contact between the knife edge and the face of the flue whether the hook angle is proper, or the amount of the hook angle may be determined by setting the flute face against the knife edge and reading the amount of offset.

Referring to the drawings, the checker comprises a hollow base or standard 10 having an electric lamp 12 mounted on the inside and under the top surface thereof. A transparent window 14 may be provided in the top surface through which the light shines from bulb 12 for the visual check.

A circular cutter 16 having flute faces 18 is mounted on a spindle 17 between vertical centers 20 and 22. The lower vertical center 20 is supported in a mounting plate 24 on the top surface of base 10. The plate 24 has a segment removed therefrom leaving a space 26 so that the flute being checked lies clearly over the window 14 and may be easily seen.

The upper center 22 is mounted within a hub 28 formed on the outer end of an arm 30, the inner end of which is connected to a split collar 32. The hub 28 also has a segment 34 removed therefrom which is aligned directly above the segment 26 so that a clear line of vision may be had directly down on the flute being checked.

The collar 32 is mounted on the upper end of a vertically movable column 36 which is mounted in suitable bearings on base 10. The collar 32 may be clamped to the column 36 by means of a clamp 37. The column 36 has a rack 38 fixed to one side thereof which is adapted to mesh with a pinion 40. The pinion 40 is mounted on a transverse shaft 42 which is mounted on suitable bearings in the standard. The outer end of the shaft is connected to a hand wheel 44 so that by turning the hand wheel, the column 36, together with center 32, may be raised or lowered.

The means for checking the hook angle includes an elongated indicator member 46, which is rectangular in cross-section and which has a pointed end provided with a knife edge 48 lying on the longitudinal center line of member 46. The member 46 is slidably mounted in parallel ways 50 provided in a mounting plate 52. The member 46 may be moved in and out within such ways and may be fixed in position by means of a thumb screw 54, which is mounted on a cross member on plate 56 above the ways 50. The plate 52 is mounted on another supporting plate 56 for movement across such plate, and guide means are provided to insure movement of the plate 52 with respect to plate 56 so that it is moved on a line perpendicular to a radius of the cutter. The knife edge 48 thus will always lie on a line parallel to the perpendicular radius, or it will lie directly on the radius in the center position of plate 52.

The guide means include a rod 58 which has its ends mounted in side plates 60 on member 56. The bar 58 passes through a collar 62 which is received within a transverse opening through member 52. The longitudinal center line of the bar 58 also lies on a line perpendicular to a radius of the cutter so that as the member 52 is moved transversely, it is guided accurately on such line.

The rear edge of plate 52 is formed with a shoulder 64 which is adapted to be engaged by an overhanging shoulder on a clamp 66. Such clamp 66 is mounted on the rear edge of plate 56 and may be clamped against the shoulder 64 by means of a thumb screw 68 to hold the plate 52 in any transverse position.

Micrometer gages 70 are also mounted within split openings in ends 60 and their inner ends 72 are adapted to project against the opposite sides of member 52.

When the knife edge 48 lies on the radius of the cutter, the micrometer readings 70 will be at zero. When the plate 52 is offset to one side, the extent of such offset will be indicated by the micrometer reading on that side. The micrometer may be clamped in any of its positions.

The indicating means including the block 52 and the plate 56 may be vertically moved in that the plate 56 is integral with a depending channel member 74. Such channel member is slidably mounted for vertical movement with respect to the standard 10 on ball bearing assemblies 76. The shaft 78 of a hand wheel 80 projects through an aperture in member 78 and through the ball bearing assemblies and through the front wall of standard 10 where it is secured to standard 10 by means of a nut 82. A vertical rack 84 is fixed to the member 74 and meshes with a pinion 86 which is keyed to shaft 78. Thus, by turning the hand wheel 80, the indicating means may be vertically adjusted.

Viewing Figure 2, the cutter 16 has a predetermined hook angle and to check the angle on one of the flute faces the cutter 16 is turned so that such face 18 is in contact with the knife edge 48. The trueness of such contact may be readily seen by looking down on the knife edge 48 and any variations will be readily apparent from the light shining between knife edge 48 and face 18. The distance between knife edge 48 and the cutter radius, or the center position of block 52, will indicate the hook angle. A hook angle on the opposite side of the radius may also be checked by moving the member 46 and turning it over so that the knife edge faces in the opposite direction. The block 52 may be slid to the other side of the radius to indicate that hook angle.

While the above structure has been described for its use in checking the hook angle, it will also be appreciated that it may be employed for checking the faces of radial flutes or flutes having a drag angle. When checking radial flutes, the knife edge is placed directly on the radius. For checking flutes with a drag, the flute face would be disposed on the opposite side of the radius from that shown in the drawings and the extent of such offset would be a measure of the drag.

What is claimed:

1. A device of the type described comprising a standard, means on said standard for mounting a cutter for rotation about its center, an indicator having a linear edge for contacting a flute face on said cutter, means mounting said indicator for movement along a line fixed relative to said standard and perpendicular to a radius from said center substantially in the plane of the cutter, means for moving said indicator along said line, said contacting edge being in said plane, said mounting means including means for mounting said indicator for movement along a line parallel to said radius with said linear edge parallel to said radius.

2. A device of the type described comprising a standard, means on said standard for mounting a cutter for rotation about its center on a vertical axis, an indicator having a knife edge, means mounting said indicator for movement along a line perpendicular to a radius from said center substantially in the plane of the cutter, means for moving said indicator along said line, said mounting means including means for mounting said indicator for movement along a line parallel to said radius, and illuminated means disposed under said cutter.

3. A device of the type described comprising a standard, means on said standard for mounting a cutter for rotation about its center, an indicator having a knife edge, means mounting said indicator for movement along a line perpendicular to a radius from said center substantially in the plane of the cutter, means for moving said indicator along said line to either side of said center and for indicating the extent of such movement, said mounting means including means for mounting said indicator for movement along a line parallel to said radius.

4. A device for checking the hook angle of a cutter comprising a standard, means on said standard for mounting a cutter for rotation about its center on a vertical axis, an indicator having a knife edge, means reversibly mounting said indicator for movement along a line perpendicular to a radius from said center substantially in the plane of the cutter, micrometer elements for moving said indicator along said line to either side of said center and for indicating the extent of such movement, said mounting means including means for mounting said indicator for movement along a line parallel to said radius, illuminated means disposed under said cutter to direct light upwardly in the region of said knife edge.

HOWARD SPEDDING.